United States Patent Office 3,063,958
Patented Nov. 13, 1962

3,063,958
CURING TYPE ADHESIVES COMPRISING POLY-ESTER-POLYISOCYANATE REACTION PRODUCT, TACKIFYING RESIN AND MINERAL FILLER
John L. Perkins, Hingham, and Dewey M. Holmberg, Canton, Mass., assignors, by mesne assignments, to United Shoe Machinery Corporation, Boston, Mass., a corporation of New Jersey
No Drawing. Filed May 12, 1959, Ser. No. 812,599
9 Claims. (Cl. 260—38)

This invention relates to curing type adhesive compositions particularly adapted for securing together shoe parts.

This application is a continuation-in-part of the copending application Serial No. 743,007, filed June 19, 1958, in the names of John L. Perkins and Dewey M. Holmberg, entitled "Curing Type Adhesives," now abandoned.

In the manufacture of shoes, one of the simpler and usually less expensive methods of attaching shoe soles is by means of an adhesive cement. In the early stages of cement sole attaching pyroxylin solutions were used; but with the increasing use of substitute soling materials, adhesive cements based on rubber, usually synthetic rubber solutions, have largely displaced pyroxylin. These rubber based adhesives usually involved combinations of a natural or synthetic rubber with a resinous modifying or reinforcing addition. The cements have been quite effective to secure satisfactory sole attaching for relatively thin flexible soles as used in women's shoes. The cements have not been entirely satisfactory for use in heavier soled shoes such as work shoes. That is, the cements have not given an initial bond of sufficient strength to hold stiff heavy soles to the shoe within the limited time available for holding the soles and shoes in pressure contact during sole attaching nor have they been adequate to hold such heavy soles on in severe use conditions.

Curing type rubbery materials derived by reaction of a polyisocyanate with a polymeric material having a plurality of active hydrogen groups have recently come into prominence and aroused interest for various uses because of their outstanding strength and toughness. The strength and toughness are developed only after a substantial period of cure. This factor, which would require impracticable periods of time during which the sole must be held pressed against a shoe, coupled with the further requirement that because of its curing nature the adhesive must be mixed immediately before use, have heretofore prevented use of polyisocyanate adhesives for cement sole attaching.

It is a feature of the present invention to provide an isocyanate based curing type adhesive system stable for substantial periods and adapted to provide a high initial bond in a short time in attachment of soles to shoes and to provide an extraordinarily high strength permanent bond.

It has been found that a curing adhesive providing a high initial bond for attachment of soles together with satisfactory physical properties for application in cement sole attaching may be obtained by combining a special mixture of reinforcing fillers with a polyisocyanate-reacted polyester, a polyisocyanate and a tackifying resin.

It has also been found that reinforcing fillers introduce difficulties on storage either in settling out of the adhesive or gelling of the adhesive with which combined and that these difficulties may be overcome through combining mineral fillers of different properties in special ranges of relative proportions in the adhesive composition.

The new adhesive is a two-part cement in which the part A is compounded to overcome special problems of stability on storage peculiar to the polymer solution base of the part A, the part A when combined with the part B providing a high strength initial bond and extraordinarily tough, strong, final bond particularly useful for permanent attachment of soles to shoes.

The part A includes in addition to the polymer solution base a special balanced combination of mineral fillers which cooperate with the polymer components in giving the special advantages in the adhesive.

The polymer solution base includes the reaction product of a polyester and a polyisocyanate together with a tackifying resin preferably of curing type.

Many polyesters useful for reaction with polyisocyanates are known and are commercially available. They are formed by esterifying and polymerizing a dibasic or polybasic carboxylic acid, or mixtures of these acids, with a complementary bi- or poly-functional compound containing more than one alcoholic hydroxyl group or mixtures of such compounds. Suitable acids for reaction to form polyesters include adipic acid, succinic acid, sebacic acid, maleic acid and azelaic acid. It is preferred that the acids be largely or entirely saturated acids. Representative polyhydric alcohols include ethylene glycol, propylene glycol, diethylene glycol, triethylene glycol, trimethylolpropane and butylene glycol. A preferred polyhydric alcohol mixture for reaction with adipic acid includes from 95% to 99% of dihydroxy alcohol such as butane diol or an ethylene glycol. From 1% to 5% of a trihydroxy alcohol such as trimethylolpropane may be included with the dihydroxy alcohol. The reaction of these materials to form polyesters ordinarily involves a simple heating for a few hours, usually with removal of water formed during reaction by maintaining a vacuum over the reaction mixture. Final water content should be as low as possible, preferably not over 0.1%. The acid and alcohol are combined in proportions providing a substantial excess of hydroxyl groups over acid groups and the reaction is carried to a point giving a product having hydroxy groups, preferably terminal, with a hydroxyl number of from about 30 to 140, preferably from about 50 to about 60, and an acid number of from 0 to 12. The polyesters employed are liquid or readily heat-softenable resins having relatively low molecular weight, suitably in the range of about 2000 to about 4000.

Reaction of the polyesters with the polyisocyanates involves mixing one or more polyisocyanates with one or more polyesters and heating the mixture until the reaction is substantially complete. The reacted material is then cooled to solidify it and broken up for convenience in handling. Arylene diisocyanates such as 2,4-tolylene diisocyanate, 1,5-naphthalene diisocyanate, m-phenylene diisocyanate, bitolylene diisocyanate, and diphenylmethane-p,p' diisocyanate are preferred because of toxicity problems with aliphatic isocyanates; but aliphatic isocyanates such as hexamethylene diisocyanate, or pentamethylene diisocyanate may be used along with or in place of the arylene diisocyanate if proper health precautions are taken. The isocyanate and polyester are combined in relative proportions of about 0.9 to about 1.4 mols of diisocyanate per mol of polyester.

The tackifier component of the part A is a resinous material compatible with the polyester-polyisocyanate reaction product and operating to increase the aggressiveness of the adhesive action of a film of the mixture to establish a bond rapidly and over the complete surfaces to be joined. The preferred tackifier resins are polyepoxide resins having melting points of from 20° to 110° C. and having epoxide equivalent values of preferably from 225 to 1025, but resins having somewhat higher epoxide equivalents up to about 2400 may be used where a lower degree of cure of the epoxide resin is acceptable. The term "epoxide equivalent" means grams of resin containing one gram equivalent of epoxide. The polyepoxide resins are glycidyl polyethers of a polyhydric phenol, a polyhydric alcohol, or both. The most effective polyepoxide resins in the present composition are those having a relatively low molecular weight and containing a relatively large proportion of active epoxide groups. These polyepoxides are complex resinous materials and may be produced by the reaction of polyhydric phenols with a polyfunctional chlorhydrin such as epichlorhydrin and glycerol dichlorhydrin. The chlorhydrin is employed in proportion in excess of a molecular equivalent of the phenolic material and may be employed in amount up to twice the equivalent of the phenolic material, for example two mols of epichlorhydrin may be reacted with one mol of diphenylol propane in the presence of caustic alkali in excess of the amount required to combine with the halogen of the epichlorhydrin. On heating to about 100° C. there is formed a resinous complex polymeric material containing both terminal epoxy groups and terminal primary hydroxyl groups. Polyhydric phenols for use in forming these resins include in addition to diphenylol propane such polyhdric phenol materials as bis phenol, hydroquinone, resorcinol and others. Complex epoxides may also be made by reacting polyhydric phenols with simpler polyepoxides to give complex polyepoxides. For example, glycerin or trimethylol propane may be reacted with epichlorhydrin to give a simple polyepoxide which may then be reacted with dihydric phenols to form useful complex polyepoxide resins. The preparation of epoxide resins is shown in United States Patents Nos. 2,506,486 to Bender et al., issued May 2, 1950, and 2,589,245 to Greenlee, issued March 18, 1952.

Other useful tackifying resins include chlorinated polyphenyls including chlorinated biphenyls and chlorinated terphenyls, and alkali catalyzed para-substituted phenol aldehyde resins such as the resinous condensate of para-tertiary-butyl phenol with at least an equivalent amount of formaldehyde.

The polyepoxide resins and the phenol formaldehyde resins are reactive with the isocyanates. However, it has been found that the polyepoxide resin gives markedly superior results to the other tackifying resins. It not only gives superior tack or aggressive adhesiveness but also gives a longer period of tackiness prior to curing and after curing exerts a substantial reinforcing action in the adhesive bond.

Solvents useful in the part A of the adhesive composition are water-free volatile organic solvents which do not react with the polyisocyanates. Preferred solvents are the ester and ketone solvents such as ethyl acetate, anhydrous ethylene glycol-monoethyl ether acetate, acetone and methyl ethyl ketone alone or in mixture. Up to 15% toluene may be included in the solvent if desired.

It has been found that finely divided mineral reinforcing fillers such as calcium silicate markedly increase the initial bond strength of the adhesive upon bringing together surfaces to be bonded. In the adhesive a proper proportion of suitable reinforcing filler will hold even stiff soles onto shoe uppers without significant legging or opening up of the bond joint in less than one-tenth the holding time or dwell required for the same polymer base composition without the special filler. Used as the only filler, however, calcium silicate causes gel formation in the part A within a relatively short time so that the part A cannot be combined with the part B for use.

Surprisingly, the gelling may be prevented by incorporating a very fine fibrous mineral filler along with the reinforcing filler. Fibrous mineral fillers such as asbestine, i.e. fibrous magnesium silicate, provide the further effect of "bulking" the cement to enable better spreading or covering action, although if used alone, i.e. without the reinforcing mineral fillers, the fibrous filler tends to settle out upon standing.

Additional finely divided mineral filler such as a silica aerogel or iron-free fluffy silica is effective in combination with the other fillers to provide a false bodying or thixotropic effect. This effect is desirable to prevent running or drooling of a cement coating applied to a surface such as a shoe sole while it does not create difficulties in pumping or spreading the cement. The silica also contributes to film strength.

Stability of the part A on long time storage is markedly improved through inclusion of from about ¼% to about 5%, preferably about 1%, by weight based on the weight of the polyester-polyisocyanate reaction product of maleic acid or maleic anhydride. Maleic acid or anhydride tends to prevent increase in viscosity and appears to improve the adhesion of the cement to difficultly bonded materials.

Effective cooperation of the polymers and mineral fillers depends on use of proper proportions of the materials. The tackifying resin should be within the range of from 5 parts to 25 parts, preferably about 7 to 15 parts, on 100 parts of the reaction product of polyester and polyisocyanate. The mineral filler is used to the extent of from 30 to 60 parts by weight on 100 parts of the reaction product of polyester and polyisocyanate.

In the mineral filler itself, to obtain proper balance of the effects described above obtained through the use of the combination of mineral fillers, it is important that the components be within fairly narrow ranges of proportions.

Of the 30 to 60 parts of mineral filler referred to above, there will be employed from 15 to 35, preferably about 25, parts by weight of the finely divided calcium silicate, from 10 to 25, preferably about 15, parts by weight of the fibrous magnesium silicate, and from 5 to 20 parts, preferably about 10 parts, of iron-free silica.

The part B of the adhesive is a solution in a non-reactive volatile organic solvent of one or more polyisocyanates. A preferred polyisocyanate is polymethylene polyphenylisocyanate having the following formula:

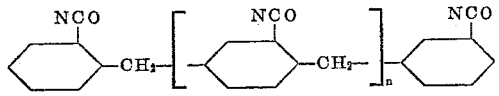

where $n$ averages about 3; but other polyisocyanates or diisocyanates may be used along with or in place of this material. Useful isocyanates include triphenyl methane triisocyanate, methylene bis(4-phenyl isocyanate), diphenyl methane diisocyanate, and blocked isocyanates such as triphenyl urethane. Very desirable results including an improvement in spot tack have been obtained with compositions of which the active isocyanate was from 50% to 70% by weight of polymethylene polyphenyl isocyanate with from 50% to 30% by weight of, for example, methylene bis(4-phenyl isocyanate) or a blocked isocyanate.

Compounding of the adhesive follows known compounding procedure. The polyester-polyisocyanate reaction product is worked on a cold mill until it bands and the reinforcing mineral filler and fibrous mineral filler are added and thoroughly milled in. The milled mixture is sheeted out and introduced into a churn containing the solvent and the churn is operated until the milled mixture dissolves. Thereafter the silica, polyepoxide resin and dibasic organic acid are added and thoroughly mixed in. For use in bonding soles to shoes the viscosity is then adjusted to a suitable value, preferably from about 60 to 70 seconds. (⅜" steel ball falling through a tube 19.2 mm. inside diameter containing the adhesive. The test is carried out at 25° C. and the space between the markers used for observing the time of falling of the ball is 40 cm.)

Manufacture of the part B involves simple dissolving of the polyisocyanate in solvent. Usually the polyisocyanate is used with sufficient solvent so that 10% by volume of the part B based on the volume of the part A is sufficient to effect a cure.

In the finished adhesive, sufficient of the part B is combined with the part A to provide from about 5% to about 15%, preferably about 8% to about 12%, by weight of polyisocyanate based on the weight of the polyester-polyisocyanate reaction product in the part A. Mixing sets in process a reaction between the polyisocyanate of the part B and the polyester-polyisocyanate reaction product in part A. It appears also that the polyisocyanate of the part B acts on the reactive hydroxyl groups of the polyepoxide where polyepoxide is used as the tackifying resin to effect a curing of the polyepoxide. At room temperature the reactions do not proceed to a point which will interfere with application and use of the cement for a period of about 24 hours.

The mixture of parts A and B is spread on both the sole and the upper and allowed to dry for from 2 to 24 hours at room temperature or for a maximum of 8 hours at 100° F. The cement coatings on the shoe upper and on the shoe sole are heated by radiant heat to bring the temperature to from about 150° to about 180° F. if the soles are to be attached to the shoes within about 2 to about 4 hours from the time the cement was applied or to temperatures of about 195° to about 240° F. if the cement has been applied for 24 hours.

The heated sole is pressed against the shoe upper and held in contact for a period of from 10 to 30 seconds depending upon the stiffness of the sole and the degree of curvature which must be pressed into the sole.

The following examples are given as of assistance in understanding the invention and it is to be understood that the invention is not restricted to the particular conditions, proportions or reagents recited in the examples:

Example I

There were banded on a mill 100 parts by weight of a commercially vailable product (Multranil 176) obtained by reaction of 1.13 mols of tolylene diisocyanate with one mol of a hydroxyl terminated polyester of adipic acid and butylene glycol, the polyester having a hydroxyl number of about 55 and an acid number of 2. 25 parts by weight of finely divided calcium silicate were added slowly to the reaction product on the mill and the material on the mill continuously cut back until the calcium silicate was uniformly dispersed. Thereafter 15 parts of fibrous magnesium silicate (Asbestine 3X) were added slowly in the same manner. After approximately 10 minutes of milling the compound on the mill had reached a temperature of 175° to 190° F. and the compound was sheeted out and cut into strips for solution in a churn.

240 parts by weight of ethyl acetate were placed in a churn and 10 parts of finely divided fluffy iron-free silica were sifted into the liquid in the churn. The strips of milled compound were slowly added to the liquid in the churn over a 30 minute period in the course of which they dissolved.

To the solution in the churn there were then added 25 parts by weight of finely powdered glycidyl ether polyepoxide resin having a melting point of from 40° C. to 76° C., an epoxide equivalent of from 450 to 525, and an average molecular weight of from 900 to 1,000. (The epoxide equivalent is the weight of resin in grams which contains one gram chemical equivalent of epoxy.) One part by weight of maleic acid was then added and mixing continued in the churn to form a uniform solution free from lumps. An additional 25 parts by weight of ethyl acetate was added and mixed in to adjust the viscosity of the mixture to 60 seconds (⅜″ steel ball falling through the liquid at 25° in a 19.2 mm. inside diameter tube between marks 40 cm. apart).

10 parts by weight of polymethylene polyphenyl isocyanate (Papi) was dissolved in a solvent mixture containing 51 parts by weight of ethyl acetate and 5.5 parts by weight of o-dichlorobenzene.

One part by volume of the solution of the polymethylene polyphenyl isocyanate was added to 16 parts by volume of the solution containing the isocyanate reaction product and thoroughly mixed.

The mixture was spread on the surfaces to be joined of a polychloroprene shoe sole and leather shoe upper and allowed to dry for four hours at room temperature. The coatings on the shoe upper and on the shoe sole were then heated by radiant heat to bring the coating temperature to 180° F. and the shoe sole was assembled with the shoe upper and pressed firmly against it to make the shoe sole conform to the shoe upper. The shoe sole and shoe upper were held in engagement for 20 seconds at which time the pressure was removed and it was found that the shoe sole remained in tight adhesively bonded engagement with the shoe upper.

When tested 48 hours after assembly, the shoe sole required a pull of 85 lbs. to remove it and failure occurred in the sole stock.

Example II

An adhesive was made up following the same procedure employed in making the adhesive of Example I, in which the components of the adhesive were 100 parts of the same reaction product of a polyester and a polyisocyanate, 25 parts by weight of finely divided calcium silicate, 15 parts by weight of fibrous magnesium silicate, 10 parts by weight of iron-free silica and 10 parts by weight of chlorinated terphenyl having a softening point (B. and R.) of 100° to 106° F., a refractive index of 1.663, a chlorine content of 60% and a density of 13.9 pounds per gallon, the solvent for the mixture comprising 240 parts by weight of ethyl acetate.

One part by volume of the polymethylene polyphenyl isocyanate solution of Example I was added to 16 parts by volume of the above solution and the mixture was used for bonding rubber soles to leather shoe uppers in accordance with the procedure shown in Example I.

The shoe soles were found to be strongly and tightly attached to the shoes and when tested after 48 hours 60 to 80 lbs. were required to pull the shoe sole from the shoe upper. Failure occurred partly in the leather of the shoe upper and partly in the rubber of the shoe sole.

Example III

A solution was prepared in accordance with the procedure of Example I including the same reaction porduct, fillers, polyepoxide resin and solvent in the same proportions.

A solution was prepared in which 7 parts by weight of polymethylene-polyphenyl isocyanate and 3 parts by weight of diphenyl methane-4,4′ diisocyanate were dissolved in a solvent mixture containing 51 parts by weight of ethyl acetate and 5.5 parts by weight of o-dichlorobenzene.

One part by volume of the latter solution was added to 16 parts by volume of the solution of the isocyanate reaction product and thoroughly mixed.

The mixture was spread on surfaces to be joined of a rubber shoe sole and leather shoe upper and allowed to dry for 3 hrs. at room temperature. The coatings on the shoe upper and on the shoe sole were then heated by radiant heat to bring the temperature of the coatings to 180° F. and the shoe sole was assembled with the shoe upper. The adhesive showed excellent spotting tack. The assembled sole and shoe upper were placed in a sole attaching press, the sole was pressed firmly against the upper to insure its conforming to the shoe upper. The shoe sole and shoe upper were held in engagement for 20 seconds at which time the pressure was removed and it was found that the shoe sole remained in tight adhesively bonded engagement with the shoe upper.

When tested 48 hrs. after assembly the shoe sole required a pull of 80 lbs. to remove it and failure occurred in the sole stock.

Having thus described our invention, what we claim as new and desire to secure by Letters Patent of the United States is:

1. An adhesive cement comprising a solution in a volatile organic solvent of (1) the product of reacting a resinous polyester from esterification and polymerization of a saturated dibasic acid and a glycol and having an acid number of from 0 to 12, a hydroxyl number of 30 to 140 and a molecular weight of from 2,000 to 4,000 with an organic diisocyanate, said polyester resin and said diisocyanate being reacted in the ratio of about 0.9 to about 1.4 mols of diisocyanate per mol of polyester, (2) a tackifying resin compatible with said product of reaction and having a melting point of from 20° to 110° C., said tackifying resin being selected from the group consisting of a glycidyl ether polyepoxide resin, a resinous chlorinated polyphenyl and an alkali-catalyzed heat advancing condensation product of one mol of a para-substituted phenol and about one mole of formaldehyde, (3) from about 5% to about 15% by weight based on the weight of said product of reaction of at least one arylene polyisocyanate from the group consisting of polymethylene polyphenyl isocyanate, triphenyl methane triisocyanate, methylene bis(4-phenyl isocyanate), diphenyl methane diisocyanate, and triphenyl urethane, and (4) from about 30% to about 60% by weight of said product of reaction of a mineral filler mixture, said mineral filler mixture comprising, based on the weight of said product of reaction, from about 10% to about 25% by weight of fibrous magnesium silicate, from about 15% to about 35% by weight of finely divided calcium silicate, and from about 5% to about 20% by weight of finely divided, substantially iron-free silica.

2. An adhesive cement comprising a solution in a volatile organic solvent of (1) the product of reacting a resinous polyester from esterification and polymerization of a saturated dibasic acid and a glycol and having an acid number of from 0 to 12, a hydroxyl number of 30 to 140 and a molecular weight of from 2,000 to 4,000 with an organic diisocyanate, said polyester resin and said diisocyanate being reacted in the ratio of about 0.9 to about 1.4 mols of diisocyanate per mol of polyester, (2) from about 5% to about 25% by weight based on the weight of said product of reaction of a tackifying resin compatible with said product of reaction and having a melting point of from 20° to 110° C., said tackifying resin being selected from the group consisting of a glycidyl ether polyepoxide resin, a resinous chlorinated polyphenyl and an alkali-catalyzed heat-advancing condensation product of one mol of a para-substituted phenol and about one mol of formaldehyde, (3) from about 5% to about 15% by weight of said product of reaction of at least one arylene polyisocyanate from the group consisting of polymethylene polyphenyl isocyanate, triphenyl methane triisocyanate, methylene bis(4-phenyl isocyanate), diphenyl methane diisocyanate, and triphenyl urethane, and (4) from about 30% to about 60% by weight of said product of reaction of a mineral filler mixture, said mineral filler mixture comprising, based on the weight of said product of reaction, from about 10% to about 25% by weight of fibrous magnesium silicate, from about 15% to about 35% by weight of finely divided calcium silicate, and from about 5% to about 20% by weight of finely ground, substantially iron-free silica.

3. An adhesive cement comprising a solution in a volatile organic solvent of (1) the product of reacting one mol of a resinous polyester from esterification and polymerization of a saturated dibasic acid and a glycol and having an acid number of from 0 to 12, a hydroxyl number of 30 to 140 and a molecular weight of from 2,000 to 4,000 with from about 0.9 to about 1.4 mols of an organic diisocyanate, (2) from about 5% to about 25% by weight based on the weight of said product of reaction of a tackifying resin compatible with said product of reaction and having a melting point of from 20° to 110° C., said tackifying resin being selected from the group consisting of a glycidyl ether polyepoxide resin, a resinous chlorinated polyphenyl and an alkali-catalyzed heat-advancing condensation product of one mol of a para-substituted phenol and about one mol of formaldehyde, (3) from about 5% to about 15% by weight of said product of reaction of at least one arylene polysiocyanate from the group consisting of polymethylene polyphenyl isocyanate, triphenyl methane triisocyanate, methylene bis(4-phenyl isocyanate), diphenyl methane diisocyanate, and triphenyl urethane, (4) from about ¼% to about 5% by weight of said product of reaction of a dibasic organic acid from the group consisting of maleic acid and maleic anhydride, and (5) from about 30% to about 60% by weight of said product of reaction of a mineral filler mixture, said mineral filler mixture comprising, based on the weight of said product of reaction, from about 10% to about 25% by weight of fibrous magnesium silicate, from about 15% to about 35% by weight of finely divided calcium silicate, and from about 5% to about 20% by weight of finely ground, substantially iron-free silica.

4. An adhesive cement comprising a solution in a volatile organic solvent of (1) the product of reacting one mol of a resinous polyester from esterification and polymerization of a saturated dibasic acid and a glycol and having an acid number of from 0 to 12, a hydroxyl number of 30 to 140 and a molecular weight of from 2,000 to 4,000 with from about 0.9 to about 1.4 mols of an organic diisocyanate, (2) from about 5% to about 25% by weight based on the weight of said product of reaction of a glycidyl ether polyepoxide resin having a melting point of from 20° to 110° C., (3) from about 8% to about 12% by weight of said product of reaction of polymethylene polyphenyl-isocyanate, (4) about 1% by weight of said product of reaction of maleic acid, and (5) from about 30% to about 60% by weight of said product of reaction of a mineral filler mixture, said mineral filler mixture comprising, based on the weight of said product of reaction, from about 10% to about 25% by weight of fibrous magnesium silicate, from about 15% to about 35% by weight of finely divided calcium silicate, and from about 5% to about 20% by weight of finely ground, substantially iron-free silica.

5. An adhesive cement comprising a solution in a volatile organic solvent of (1) the product of reacting one mol of a resinous polyester from esterification and polymerization of a saturated dibasic acid and a glycol and having an acid number of from 0 to 12, a hydroxyl number of 30 to 140 and a molecular weight of from 2,000 to 4,000 with from about 0.9 to about 1.4 mols of an organic diisocyanate, (2) from about 5% to about 25% by weight based on the weight of said product of reaction of a resinous chlorinated polyphenyl having a melting point of from 20° to 110° C., (3) from about 8% to about 12% by weight of said product of reaction of polymethylene polyphenyl-isocyanate, (4) about 1% by weight of said product of reaction of maleic acid, and (5) from about 30% to about 60% by weight of said product of reaction of a mineral filler mixture, said mineral filler mixture comprising, based on the weight of said product of reaction, from about 10% to about 25% by weight of fibrous magnesium silicate, from about 15% to about 35% by weight of finely divided calcium silicate, and from about 5% to about 20% by weight of finely ground, substantially iron-free silica.

6. An adhesive cement comprising a solution in a volatile organic solvent of (1) the product of reacting one mol of a resinous polyester from esterification and polymerization of a saturated dibasic acid and a glycol and having an acid number of from 0 to 12, a hydroxyl number of 30 to 140 and a molecular weight of from 2,000 to 4,000 with from about 0.9 to about 1.4 mols of an organic diisocyanate, (2) from about 5% to about 25% by weight based on the weight of said product of reaction of a glycidyl ether polyepoxide resin having a melting point of from 20° to 110° C., (3) from about 8% to about 12% by weight of said product of reaction of a mixture of an arylene diisocyanate and polymethylene polyphenyl-isocyanate in the weight ratio of from 50:50 to 30:70, (4) about 1% by weight of said product of reaction of maleic acid, and (5) from about 30% to about 60% by weight of said product of reaction of a mineral filler mixture, said mineral filler mixture comprising, based on the weight of said product of reaction, from about 10% to about 25% by weight of fibrous magnesium silicate, from about 15% to about 35% by weight of finely divided calcium silicate, and from about 5% to about 20% by weight of finely ground, substantially iron-free silica.

7. An adhesive cement comprising a solution in a volatile organic solvent of (1) the product of reacting one mol of a resinous polyester from esterification and polymerization of a saturated dibasic acid and a glycol and having an acid number of from 0 to 12, a hydroxyl number of 30 to 140 and a molecular weight of from 2,000 to 4,000 with from about 0.9 to about 1.4 mols of an organic diisocyanate, (2) from about 5% to about 25% by weight based on the weight of said product of reaction of an alkali-catalyzed heat-advancing condensation product of one mol of a para-substituted phenol and about one mol of formaldehyde having a melting point of from 20° to 110° C., (3) from about 8% to about 12% by weight of said product of reaction of polymethylene polyphenyl isocyanate, (4) about 1% by weight of said product of reaction of maleic acid, and (5) from about 30% to about 60% by weight of said product of reaction of a mineral filler mixture, said mineral filler mixture comprising, based on the weight of said product of reaction, from about 10% to about 25% by weight of fibrous magnesium silicate, from about 15% to about 35% by weight of finely divided calcium silicate, and from about 5% to about 20% by weight of finely ground, substantially iron-free silica.

8. A gel resistant storable adhesive composition curable by reaction with an arylene polyisocyanate comprising a solution in a volatile organic solvent of (1) the product of reacting one mol of a polyester from esterification and polymerization of a saturated dibasic acid and a glycol and having an acid number of from 0 to 12, a hydroxyl number of from 30 to 140 and a molecular weight of from 2000 to 4000 with from about 0.9 to about 1.4 mols of an organic diisocyanate, (2) a tackifying resin compatible with said product of reaction and having a melting point of from 20° C. to 110° C., said tackifying resin being selected from the group consisting of a glycidyl ether polyepoxide resin, a resinous chlorinated polyphenyl and an alkali-catalyzed heat-advancing condensation product of one mol of a para-substituted phenol and about one mol of formaldehyde, and (3) from about 30% to about 60% by weight of said product of reaction of a mineral filler mixture, said mineral filler mixture comprising, based on the weight of said product of reaction, from about 10% to about 25% by weight of fibrous magnesium silicate, from about 15% to about 35% by weight of finely divided calcium silicate, and from about 5% to about 20% by weight of finely ground, substantially iron-free silica.

9. A gel-resistant storable adhesive composition curable by reaction with an arylene polyisocyanate comprising a solution in a volatile organic solvent of (1) the product of reacting one mol of a resinous polyester from esterification and polymerization of a saturated dibasic acid and glycol and having an acid number of from 0 to 12, and a hydroxyl number of from 30 to 140 and a molecular weight of from 2,000 to 4,000 with from about 0.9 to about 1.4 mols of an organic diisocyanate, (2) from about 5% to about 25% by weight based on the weight of said product of reaction of a tackifying resin compatible with said product of reaction and having a melting point of from 20° C. to 110° C., said tackifying resin being selected from the group consisting of a glycidyl ether polyepoxide resin, a resinous chlorinated polyphenyl and an alkali-catalyzed heat-advancing condensation product of one mol of a para-substituted phenol and about one mol of formaldehyde, (3) from about ¼% to about 5% by weight of said product of reaction of a dibasic organic acid from the group consisting of maleic acid and maleic anhydride, and (4) from about 30% to about 60% by weight of said product of reaction of a mineral filler mixture, said mineral filler mixture comprising based on the weight of said product of reaction, from about 10% to about 25% by weight of fibrous magnesium silicate, from about 15% to about 35% by weight of finely divided calcium silicate, and from about 8% to about 20% by weight of finely ground, substantially iron-free silica.

References Cited in the file of this patent

UNITED STATES PATENTS

| | | |
|---|---|---|
| 2,818,404 | Hill | Dec. 31, 1957 |
| 2,830,965 | Ott | Apr. 15, 1958 |
| 2,891,034 | Fisch | June 16, 1959 |
| 2,893,969 | Graham et al. | July 7, 1959 |
| 2,912,408 | Nischk et al. | Nov. 10, 1959 |
| 2,929,794 | Simon et al. | Mar. 22, 1960 |
| 2,935,488 | Phillips et al. | May 3, 1960 |

FOREIGN PATENTS

| | | |
|---|---|---|
| 754,604 | Great Britain | Aug. 8, 1956 |
| 164,533 | Australia | Aug. 10, 1955 |